US010747949B2

(12) United States Patent
Livingston et al.

(10) Patent No.: US 10,747,949 B2
(45) Date of Patent: Aug. 18, 2020

(54) PRESENTING AN OVERLAY CANVAS TO INK EDIT TYPED TEXT (71) Applicant: Microsoft Technology Licensing, LLC, Redmond, WA (US)

(72) Inventors: Elise Livingston, Seattle, WA (US); Adam Samuel Riddle, Seattle, WA (US); L. Tucker Hatfield; Charles Cummins, Seattle, WA (US); Allison Smedley, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 15/952,911

(22) Filed: Apr. 13, 2018

(65) Prior Publication Data
US 2019/0317988 A1    Oct. 17, 2019

(51) Int. Cl.
G06F 17/21    (2006.01)
G06F 40/171    (2020.01)
G06F 3/0483    (2013.01)
G06F 3/0488    (2013.01)

(52) U.S. Cl.
CPC .......... *G06F 40/171* (2020.01); *G06F 3/0483* (2013.01); *G06F 3/04883* (2013.01)

(58) Field of Classification Search
CPC .. G06F 17/242; G06F 3/0483; G06F 3/04883; G06F 3/04845; G06F 17/24; G06F 3/03545; G06F 16/44; G06F 17/2247; G06F 3/0416; G06F 3/04817; G06F 3/0482; G06F 17/243; G06F 2203/0382; G06F 2203/04808; G06F 3/0481; G06F 3/167; G06F 16/951; G06F 1/1613; G06F 3/0219; G06F 3/038; G06F 3/0488; G06F 3/162; G06F 16/23; G06F 16/24539; G06F 16/248; G06F 17/212; G06F 17/241; G06F 1/1616; G06F 1/165; G06F 1/1662; G06F 1/1671; G06F 1/1692; G06F 21/64; G06F 2203/0339
See application file for complete search history.

(56) References Cited

U.S. PATENT DOCUMENTS

2006/0182344 A1* 8/2006 Geidl ................ G07C 9/37
  382/187
2016/0117489 A1* 4/2016 Furuichi ............ G06F 16/955
  726/1
2017/0153806 A1* 6/2017 Rucine ............... G06F 3/017

OTHER PUBLICATIONS

Matt Doyle, Photoshop CS3 Layers Bible (2007).*

* cited by examiner

Primary Examiner — Di Xiao (57) ABSTRACT

Systems, methods, and software are disclosed herein for presenting an overlay canvas in response to receiving an editing gesture to existing text on a canvas. In an implementation, user input is received comprising an inking gesture associated with existing text displayed on a canvas in a user interface. The inking gesture is then determined to comprise any of a plurality of editing gestures. In response to the inking gesture comprising an editing gesture, an overlay canvas is presented above the canvas in the user interface. Additional user input is received comprising inking on the overlay canvas. The inking is then incorporated into the existing text on the canvas.

20 Claims, 9 Drawing Sheets

PRESENTING AN OVERLAY CANVAS TO INK EDIT TYPED TEXT

TECHNICAL FIELD

Aspects of the disclosure are related to computing hardware and software technology, and in particular to present an overlay canvas in response to receiving an editing gesture to existing text on a canvas.

TECHNICAL BACKGROUND

Many software applications provide a digital canvas that allow users to handwrite notes, draw shapes and images, chart data, highlight text, and otherwise interact with content in a user interface to an application. Digital canvases may be found in a variety of applications, including note taking applications, productivity applications, and graphic design applications, and may be especially useful in the context of touch-based surfaces. Digital canvases are often used to gather information and generate content. The content may be illustrated in various forms, such as paragraphs of text, graphs, tables, among other items displayed on the digital canvas for a user.

Some users of a digital canvas application may want to add additional content into a canvas using digital inking. One solution for adding to existing text on a digital canvas involves a user handwriting words in the space between two words using a digital inking pen. However, this solution requires the handwritten words to be approximately the same size as the inking, which is not always practical for users handwriting text into a document. Additionally, a user hand-drawing a visual construct (e.g., a table or a graph) would not have adequate space to draw the visual construct in the desired location. This limits an ability of the application to enhance a user experience when incorporating inking into existing text on a canvas.

Overview

An enhanced system, method, and software are disclosed herein for presenting an overlay canvas in response to receiving an editing gesture to existing text on a canvas. In an implementation, user input is received comprising an inking gesture associated with existing text displayed on a canvas in a user interface. The inking gesture is then determined to comprise any of a plurality of editing gestures. In response to the inking gesture comprising an editing gesture, an overlay canvas is presented above the canvas in the user interface. Further in this implementation, additional user input is received comprising inking on the overlay canvas. The inking is then incorporated into the existing text on the canvas.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DESCRIPTION

Examples of the present disclosure describe program instructions to present an overlay canvas in response to receiving an editing gesture to existing text on a canvas. In an implementation, user input is received comprising an inking gesture associated with existing text displayed on a canvas in a user interface. The inking gesture is then determined to comprise any of a plurality of editing gestures. In response to the inking gesture comprising an editing gesture, an overlay canvas is presented above the canvas in the user interface. Further in this implementation, additional user input is received comprising inking on the overlay canvas. The inking is then incorporated into the existing text on the canvas.

A technical effect that may be appreciated from the present discussion is the increased efficiency in allowing users to insert content (e.g., text or visual constructs) by inking the content in their own handwriting with a digital pen without being constrained by the space available between the already existing text on the canvas (e.g., when inking is much larger than the typewritten text in the document). The program instructions described herein also improve the efficiency by presenting a clean space to add inking on an overlay canvas that is on top of the original canvas which may be cluttered with text and other content items (i.e., a user does not need to write directly over the existing text on the canvas and can write on a blank canvas on top of the original canvas).

Another technical effect that may be appreciated from the present discussion is that the user does not need to interact with a menu or other application button to be presented with the overlay canvas. By writing an editing gesture, the user is presented with the blank overlay canvas without being disrupted to find a button/command in the application which prompt a space to handwrite on the canvas. Another advantage which may be appreciated is the ability to mark a location on the existing text which is to be edited. This allows the inking on the overlay canvas to be inserted into the location without the user providing further instructions to the application. For example, the editing gesture may be associated with an instruction to insert text, find and replace text, insert a footer, etc. without a user needing to use additional commands in the application to indicate how the inking is to be integrated onto the canvas with existing text (i.e., writing the text and then performing additional steps to indicate that the text should replace a portion of already existing text on the canvas).

Further, examples herein described that the program instructions may further identify an instruction corresponding to the editing gesture from a set of instructions each associated with an editing gesture. In this example, the set of instructions may comprise at least one of an instruction to insert the inking at a location where the editing gesture was written, replace a portion of existing text with the inking, attach a comment card containing the inking, insert a footnote or a citation including the inking, or insert the inking into a visual construct rendered on the canvas.

In some examples, the inking comprises handwritten text. The handwritten text is then converted into typewritten text and incorporated into the existing text on the canvas. In a further example, additional user input may be received which comprises a drawing on the overlay canvas. In this example, the drawing may be incorporated into the existing text as a visual construct (e.g., a chart or a table) which is displayed on the canvas. In other examples the editing gesture comprises inking at least one of a symbol, a circle, an arrow, an underline, or a set of brackets associated with the existing text displayed on the canvas in the user interface. In some implementations, the canvas overlay comprises a semi-transparent canvas layered on top of the canvas. In other implementations, a content item comprising the existing text is rendered on the canvas. In this example, the inking is displayed in the content item comprising the existing text. In other examples described herein, a stylus supplies the editing gesture and the inking in a drawing mode.

Figure 1:
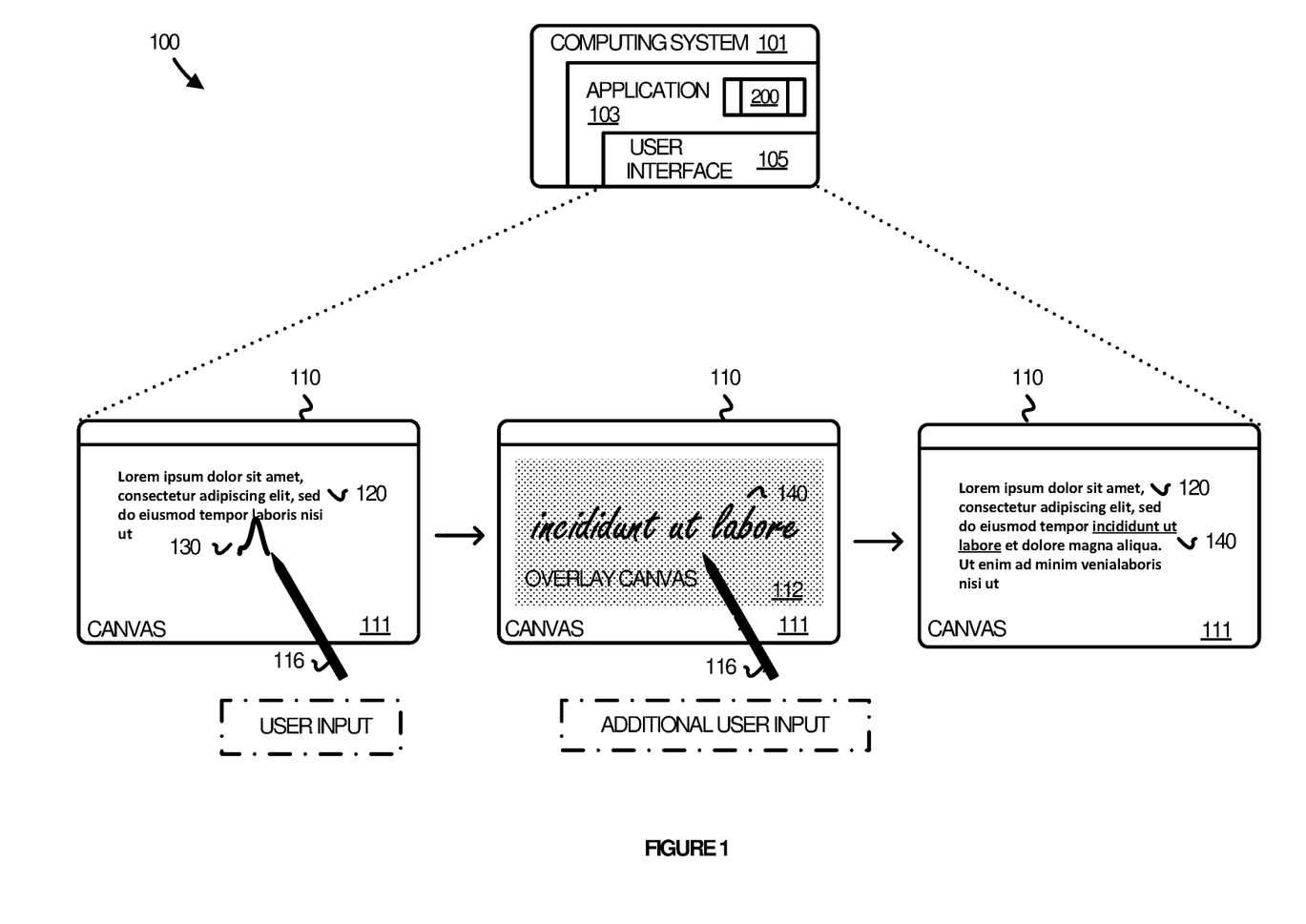
FIG. 1 illustrates an operational architecture for an implementation to present an overlay canvas in response to receiving an editing gesture to existing text on a canvas.

Referring to the drawings, FIG. 1 illustrates an exemplary operational architecture 100 related to processing operations for management of an exemplary enhanced canvas system with which aspects of the present disclosure may be practiced. Operational environment 100 includes computing system 101 on which application 103 runs. Application 103 employs an inking process 200 in the context of producing views in a user interface 105. View 110 includes canvas 111 and overlay canvas 112. View 110 is representative of a view that may be produced by application 103 in user interface 105.

Figure 9:
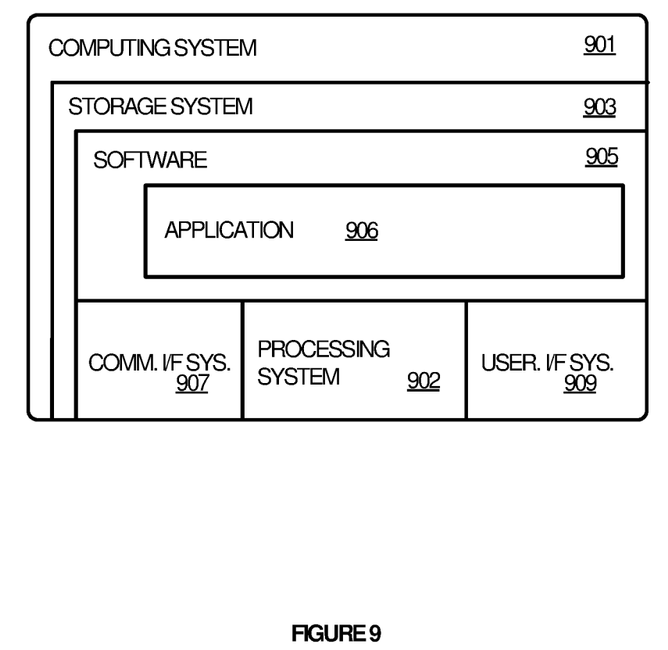
FIG. 9 illustrates a computing system suitable for implementing the canvas technology disclosed herein, including any of the architectures, processes, operational scenarios, and operational sequences illustrated in the Figures and discussed below in the Technical Description.

Computing system 101 is representative of any device capable of running an application natively or in the context of a web browser, streaming an application, or executing an application in any other manner Examples of computing system 101 include, but are not limited to, personal computers, mobile phones, tablet computers, desktop computers, laptop computers, wearable computing devices, or any other form factor, including any combination of computers or variations thereof. Computing system 101 may include various hardware and software elements in a supporting architecture suitable for providing application 103. One such representative architecture is illustrated in FIG. 9 with respect to computing system 901.

Application 103 is representative of any software application or application component capable of presenting an overlay canvas for inking edits to existing text in accordance with the processes described herein. Examples of application 103 include, but are not limited to, presentation applications, diagraming applications, computer-aided design applications, productivity applications (e.g. word processors or spreadsheet applications), and any other type of combination or variation thereof. Application 103 may be implemented as a natively installed and executed application, a web application hosted in the context of a browser, a streamed or streaming application, a mobile application, or any variation or combination thereof. It should be understood that program instructions executed in furtherance of application 103 may be offloaded in whole or in part to an operating system or additional application services operating on a remote computing system.

View 110 is representative of a view that may be produced by a drafting and authoring application, such as Word® from Microsoft®, although the dynamics illustrated in FIG. 1 with respect to view 110 may apply to any other suitable application. View 110 includes canvas 111 on which a user may include content, such as photos, text, or handwritten notes, for example. An end user may interface with application 103 to produce text, charts, graphs, diagrams, basic layout drawings, or any other type of content component displayed on canvas 111. View 110 includes overlay canvas 112 on which a user may include existing text and other content displayed on canvas 111.

The user may interface with application 103 using an input instrument such as a stylus, mouse device, keyboard, touch gesture, as well as any other suitable input device. The user may draw free-form lines, handwrite or type text, draw graphs, charts, shapes, and tables, or otherwise create content components on canvas 111. Canvas 111 may display a content item, such as a text document, presentation, slide show, spreadsheet, diagram, etc. In an enhancement, application 103 provides the ability to present overlay canvas 112 to receive and incorporate the inking into the existing text displayed on canvas 111.

Figure 2:
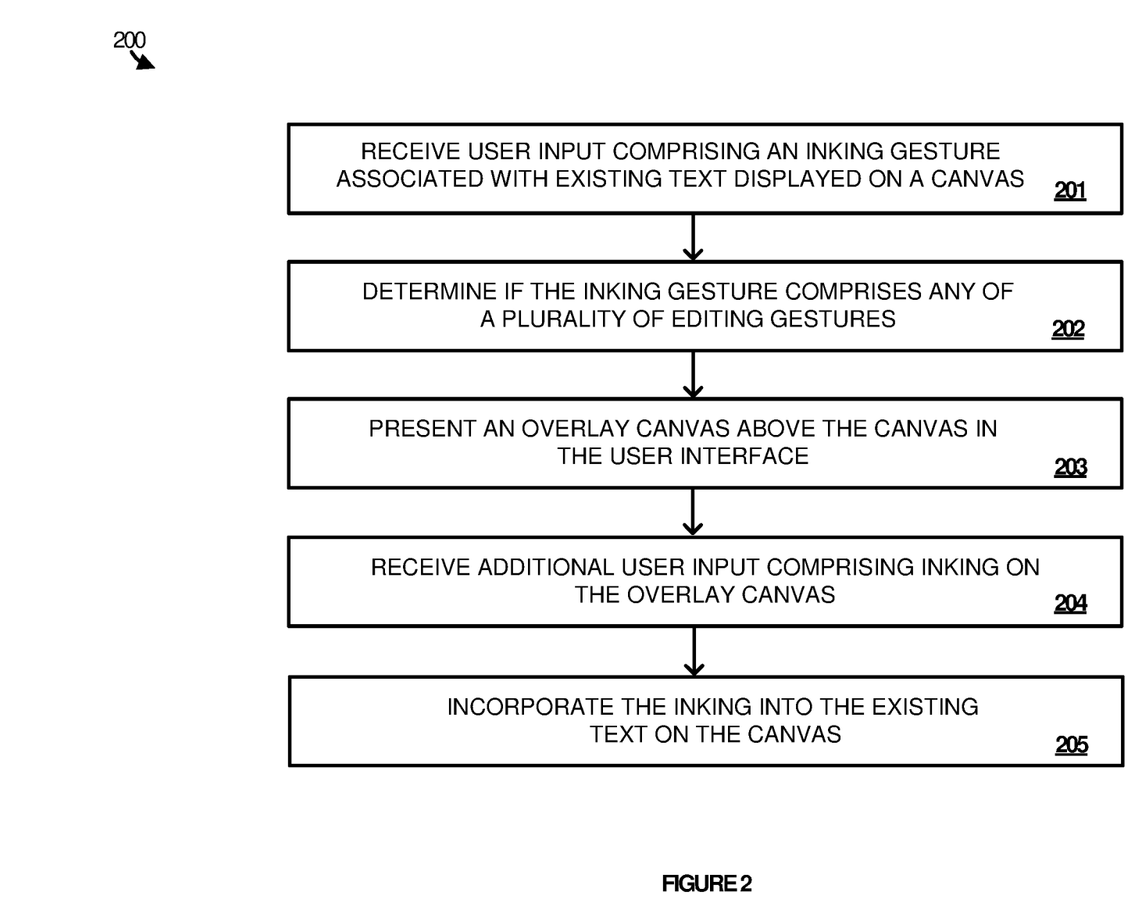
FIG. 2 illustrates an inking process employed in implementations.

More particularly, FIG. 2 illustrates inking process 200 which, as mentioned, may be employed by application 103 to allow presentation of an overlay canvas to receive an inking gesture and inking as described herein. Some or all of the steps of inking process 200 may be implemented in program instructions in the context of a component or components of the application used to carry out the overlay canvas feature. The program instructions direct application 103 to operate as follows, referring parenthetically to the steps in FIG. 2 in the context of FIG. 1.

In operation, user input is received comprising inking gesture 130 associated with existing text 120 displayed on canvas 111 in user interface 105 (step 201). Canvas 111 may include text and other components in the form of paragraphs, images, shapes, digital posts, icons, tables, graphs, charts, and the like. Canvas 111 may display existing text 120 in a document, presentation, slide show, spreadsheet, diagram, etc. An editing gesture may be determined on canvas 111 by user interface 105 receiving digital inking using an input instrument, such as stylus 116, mouse device, keyboard, touch gesture, as well as any other suitable input device.

In a next operation, it is determined if inking gesture 130 comprises any of a plurality of editing gestures (step 202). An editing gesture may comprise inking at least one of a symbol, a circle, an arrow, a line, a plus sign, an asterisk, a parenthesis, a bracket, an underline, or some other indicator on canvas 111. For example, a user inking a caret sign may indicate that inking gesture 130 comprises an editing gesture. In other examples, an instruction corresponding to the editing gesture is identified from a set of instructions each associated with an editing gesture. In some scenarios, the editing gesture indicates an instruction to modify or replace a portion of existing text 120 on canvas 111 with inking 140.

In other examples, the editing gesture indicates an instruction to attach a comment card to canvas 111 containing inking 140. In yet a further example, the editing gesture comprises an instruction to insert at least one of a header, a footnote, a citation, or a link which includes inking 140 associated with existing text 120 on canvas 111. Further implementations include that the editing gesture indicates an instruction to insert inking 140 into a visual construct rendered on canvas 111. In some implementations, overlay canvas 112 may also indicate an instruction to incorporate a visual construct into existing text 120 on overlay canvas 112.

In response to determining that inking gesture 130 comprises an editing gesture, overlay canvas 112 is presented above canvas 111 in user interface 105 (step 203). In some example scenarios, overlay canvas 112 comprises a semi-transparent canvas layered on top of canvas 111. In a next operation, additional user input comprising inking 140 is received on overlay canvas 112 (step 204). In addition to the user being able to handwrite text using digital inking, the user may also draw free-form lines or otherwise create a shape, chart, graph, table, or some other visual construct on overlay canvas 112 which may be inserted into existing text 120 on canvas 111. In some example scenarios, an ink drawing may be received on overlay canvas 112. The ink drawing may be hand-drawn on overlay canvas 112 using an input instrument such as stylus 116, mouse device, keyboard, touch gesture, as well as any other suitable input device. The ink drawing may be a hand-drawn shape, table with a number of rows and columns, a graph, a chart, or some other hand-drawn ink drawing in association with existing text 120.

In a final operation, inking 140 is incorporated into existing text 120 on canvas 112. In some examples, inking 140 is inserted into existing text 120 at a location where the editing gesture was received on canvas 111 (step 205). In other examples, inking 140 replaces a portion of existing text 120 on canvas 111. For example, inking 140 may replace a circled portion of existing text 120. Additionally, any similar portions of existing text 120 which were circled may also be replaced by inking 140. In other examples, inking 140 may be inserted into a comment card to canvas 111. The comment card containing inking 140 may then be presented on canvas 111 in association with existing text 120.

In yet a further example, inking 140 may be inserted into a header, a footnote, a citation, a link, or some other reference associated with existing text 120. For example, in response to an Asterix drawn in association with existing text 120 on canvas 111, a footnote containing inking 140 would be displayed at the bottom of canvas 111. Further implementations include that inking 140 may be inserted into a visual construct rendered on canvas 111. For example, in response to a caret being drawn on a table rendered on canvas 111, inking 140 may be converted from a hand-drawing into a formatted visual construct which is then inserted into existing text 120 on canvas 111.

In some implementations, inking 140 comprises handwritten text. In this implementation, once the handwritten text is received, the handwritten text is converted to typewritten text. The handwritten text may be converted into typewritten text using a digital inking to text converter. In this example, the typewritten text would then be incorporated into existing text 120 on canvas 111. Inking 140 may further be incorporated according to formatting settings associated with existing text 120 in a location which the user input was received. For example, inking 140 may be incorporated using the same font type, font size, font color, etc. as existing text 120 (or a portion of existing text 120) on canvas 111.

Figure 3A:
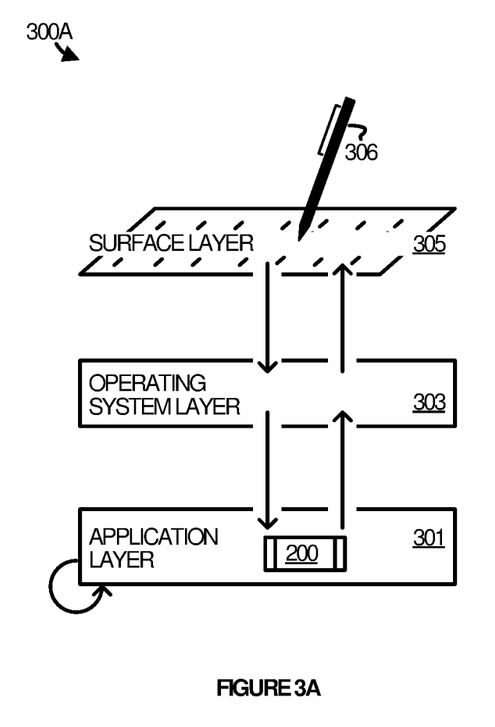
FIGS. 3A and 3B illustrate an operational architecture in an implementation.
Figure 3B:
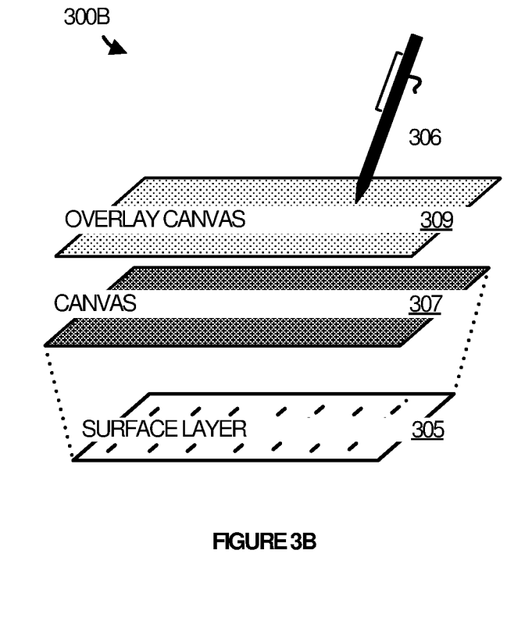

FIGS. 3A-3B illustrate various operational architectures for presenting an overlay canvas in response to receiving an editing gesture to existing text on a canvas that may be used in one or more scenarios of the present technology. FIG. 3A and FIG. 3B illustrate operational architecture 300A and operational architecture 300B respectively.

Operational architecture 300A includes a surface layer 305, an operating system layer 303, and an application layer 301. Operational architecture 300B shows additional components displayed by surface layer 305 which include canvas 307 and overlay canvas 309. Surface layer 305 is representative of any hardware or software elements that function to receive text and drawing input from an input instrument. Stylus 306 is representative of one such instrument. Surface layer 305 also displays existing text and inking on canvas 307 and overlay canvas 309.

Operating system layer 303 is representative of the various software elements that receive input information from surface layer 305 in relation to the inking input supplied by stylus 306. Operating system layer 303 may also handle some aspects of text display object rendering. Application layer 301 is representative of a collection of software elements that receive input information from operating system layer 303. Application layer 301 may also provide output information to operating system layer 303. As illustrated in FIG. 3B, canvas 307 and overlay canvas 309 are representative of virtual canvases rendered in surface layer 305 that function to receive user inputs from a digital inking instrument.

Figure 4:
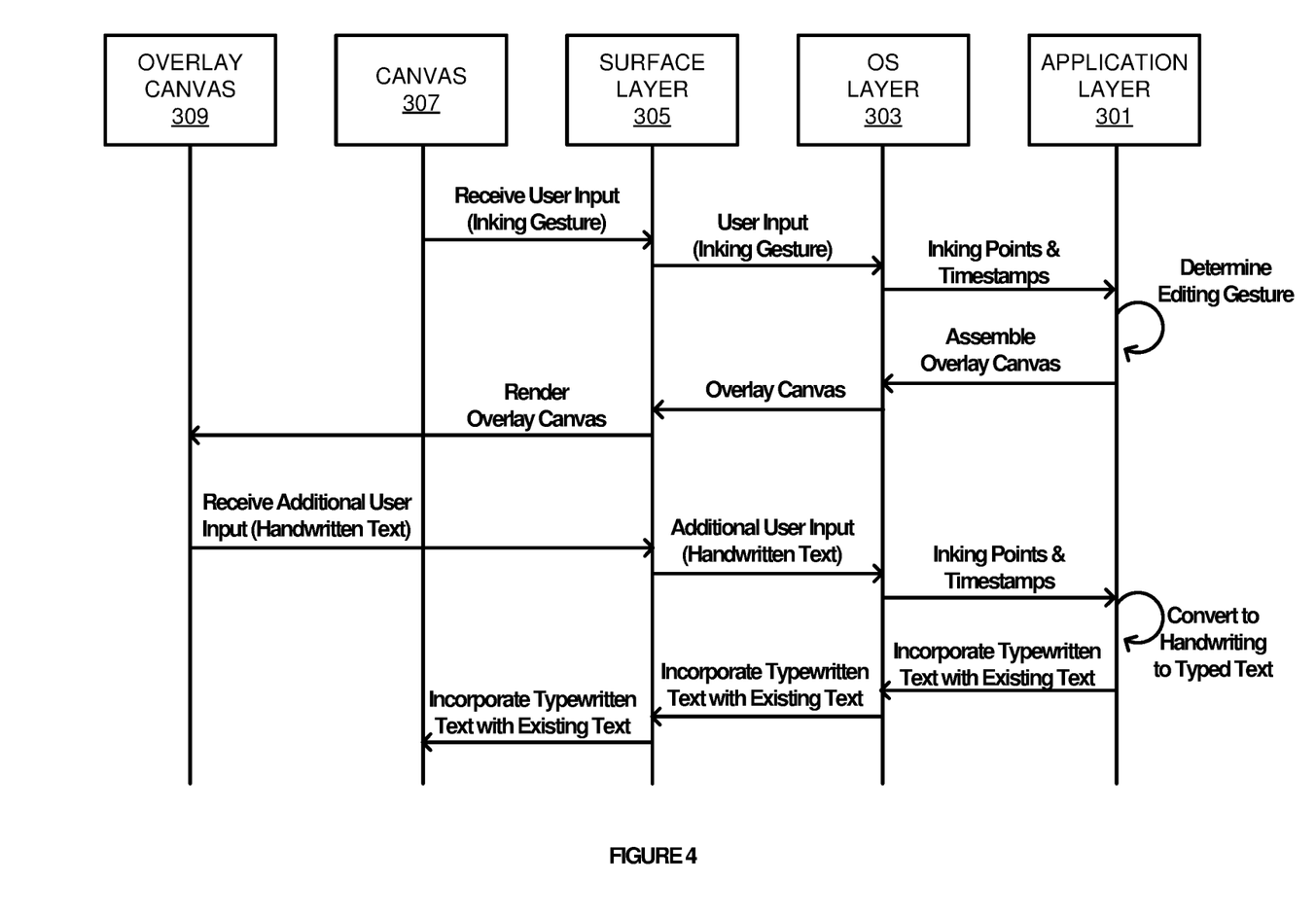
FIG. 4 illustrates a sequence diagram in accordance with in an implementation of an enhanced canvas application.

As shown in FIG. 4, an operational scenario of 300A and 300B are illustrated in accordance with implementations included herein. To begin, a user input comprising an inking gesture is supplied by stylus 306 and is received by canvas 307 rendered on surface layer 305. The inking gesture is communicated in some format to operating system layer 303. Operating system layer 303 informs application layer 301 about the ink gesture in terms of ink points, timestamps, and possibly other path data needed to identify an action type associated with the editing gesture.

Application layer 301 determines that the inking gesture comprises an editing gesture. In response to determining that the inking gesture comprises an editing gesture, application layer 103 triggers overlay canvas 309 to be assembled and provides an instruction to assemble overlay canvas 309 to operating system layer 303. Operating system layer 303 interfaces with surface layer 305 to present overlay canvas 309. In a next operation, in response to presenting overlay canvas 309, an additional user input comprising inking is written on overlay canvas 309 from stylus 306 and is again received by surface layer 305. Operating system layer 303 identifies the ink points and timestamps and transfers the ink points and timestamps to application layer 301.

Application layer 301 receives the ink points and timestamps and responsively converts the inking associated with the ink points and timestamps into inking to render on canvas 307. The inking is formatted in accordance with the formatting settings of the previously existing text rendered on surface layer 305 and provided to operating system layer 303. Operating system layer 303 then communicates with surface layer 305 so that the inking may be incorporated into existing text displayed on canvas 307. It should be understood that any operations performed in the exemplary scenario by be performed in whole or in part by operating system 303 or an application service external to application layer 301.

Figure 5:
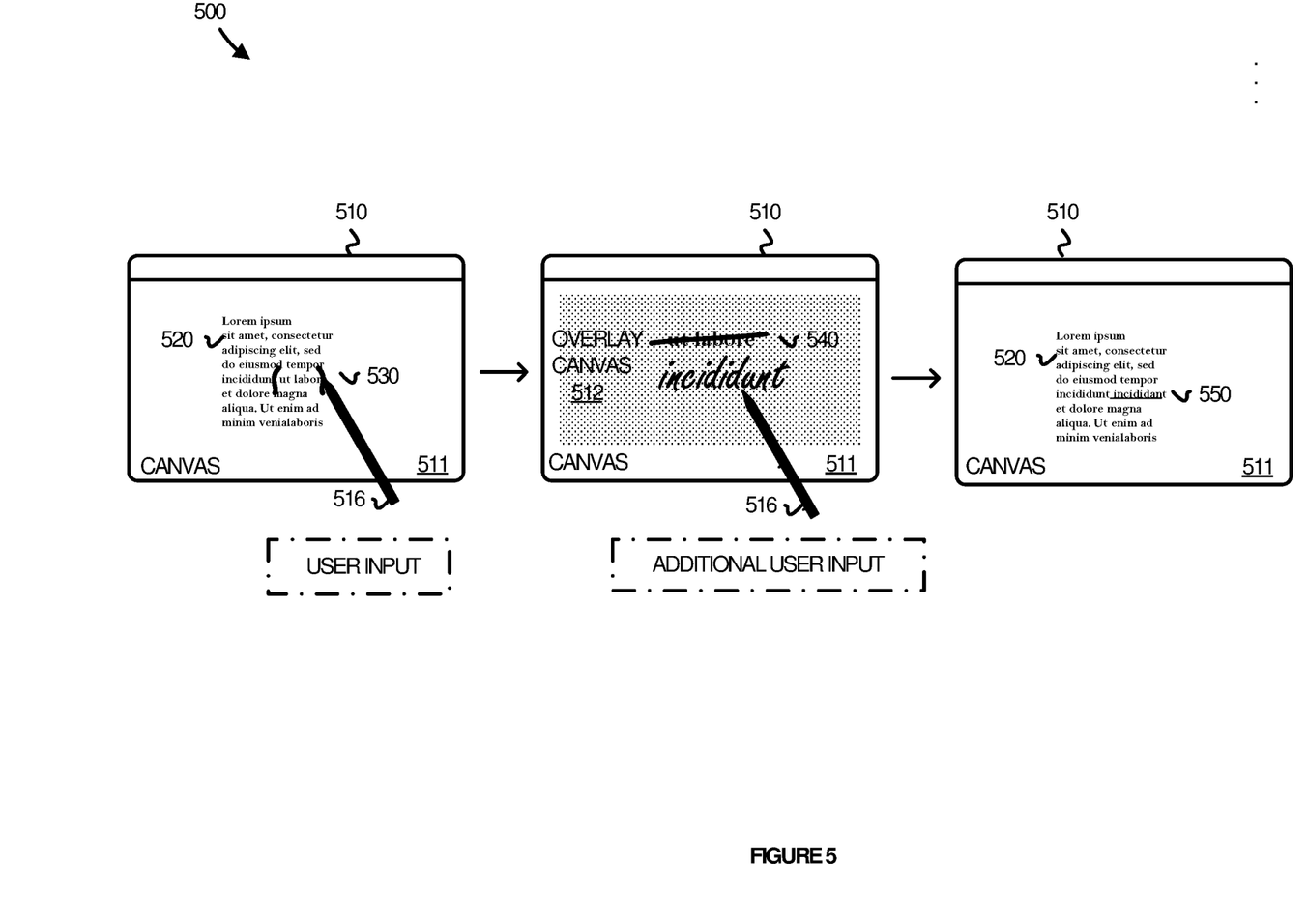
FIG. 5 illustrates an operational scenario in an implementation of an enhanced canvas application.

FIG. 5 illustrates an operational scenario for presenting an overlay canvas in response to receiving an editing gesture to existing text on a canvas that may be used in one or more scenarios of the present technology. FIG. 5 illustrates an operational scenario 500 that relates to what occurs when a user desires to find a portion of text in the document and handwrite a replacement portion of text. Operational scenario 500 includes user interface 510, canvas 511, and overlay canvas 512.

In a first operation, existing text 520 is displayed on canvas 511 in user interface 510. Inking gesture 530 is then supplied by stylus 516 on canvas 511 in user interface 510. In this example scenario, inking gesture 530 comprises a parenthesis around a portion of existing text 520. It is then determined that since inking gesture 530 comprises a parenthesis, inking gesture 530 comprising an editing gesture. In this example scenario, the parenthesis indicates that the user would like to find this portion of existing text 520 throughout existing text 520 and modify the portion of existing text 520 in some way. Although the parenthesis indicates a find and replace command in this example scenario, it should be noted that other editing gestures may be used to indicate a the find and replace command, such as a circle with a line. Additionally, in other example scenarios it should be appreciated that the parenthesis editing gesture may be used to indicate another instruction, such as an insert footnote instruction.

In a next operation, overlay canvas 512 is presented and responsively receives additional user input supplied by stylus 516. The additional user input comprises inking 540. As shown in FIG. 5, inking 540 may be written in large handwritten letters and cover a majority of the view in user interface 510. Furthermore, overlay canvas 512 is semi-transparent to allow the user to view canvas 511 without all the written content. This allows the user to have canvas 511 in view without the distraction of writing over existing text 520 on canvas 511.

The user then indicates that the portion of existing text 520 in the parenthesis should be replaced, as indicated by the strikethrough, and replaced with inking 540. Once the user has finished writing the replacement portion of existing text 520 using stylus 516, inking 540 is converted to typewritten text 550 using a digital inking to text converter. At this point in the operation, overlay canvas 512 is removed from view in user interface 510. The portion of existing text 520 in the parenthesis is found and replaced with typewritten text 550. It should be noted that typewritten text 550 is displayed on canvas 511 in a format specified by formatting settings associated with existing text 520.

Figure 6:
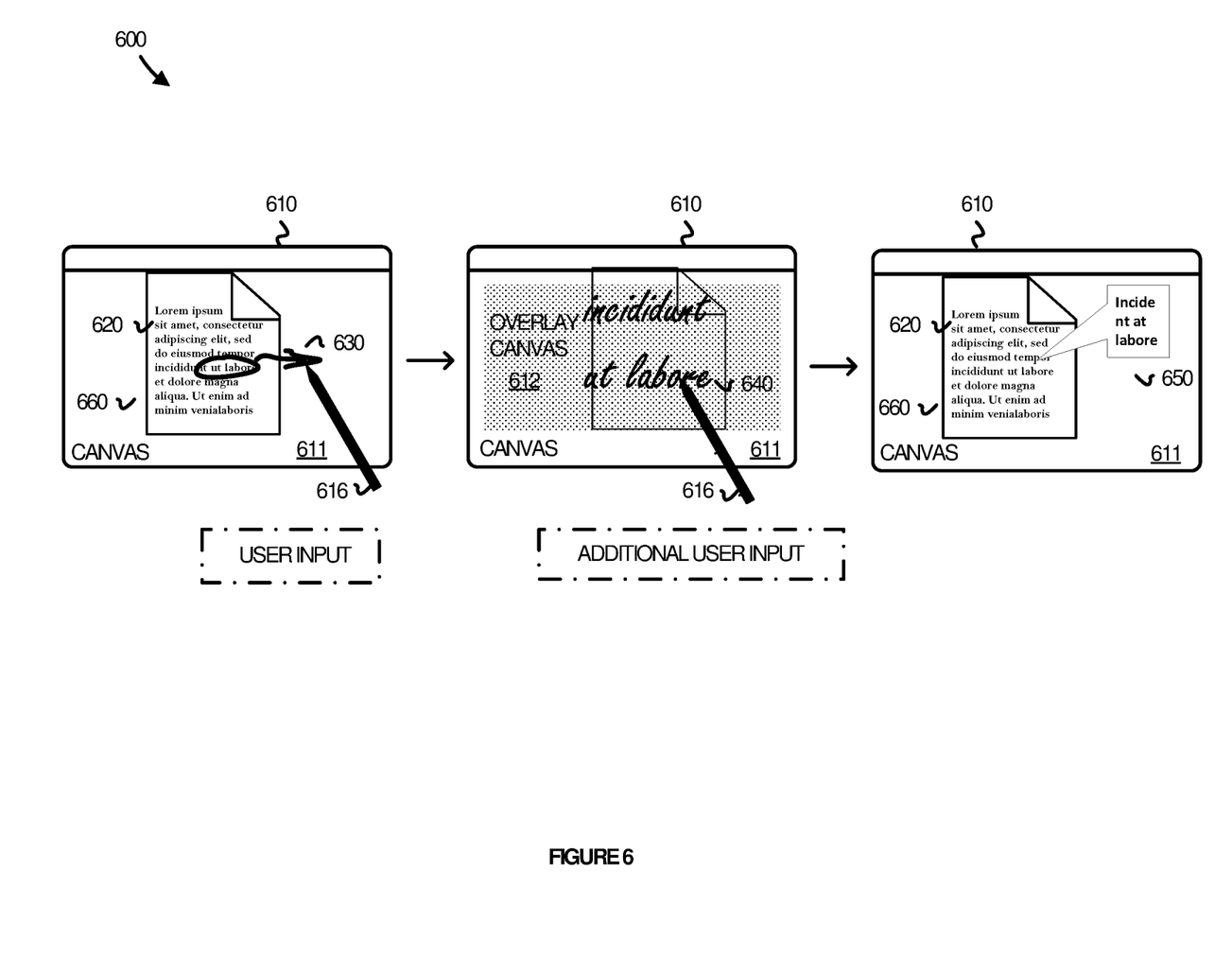
FIG. 6 illustrates an alternative operational scenario in an implementation of an enhanced canvas application.

FIG. 6 illustrates an alternative operational scenario for presenting an overlay canvas in response to receiving an editing gesture to existing text on a canvas that may be used in one or more scenarios of the present technology. FIG. 6 illustrates an operational scenario 600 that relates to what occurs when a user desires to handwrite a comment and add the typed version of the comment to a document displayed on a canvas. Operational scenario 600 includes user interface 610, canvas 611, overlay canvas 612, and document 660.

In a first operation, document 660 is displayed on canvas 611 in user interface 610. Document 660 includes existing text 620. Inking gesture 630 is then supplied by stylus 616 on canvas 611 in user interface 610. In this example scenario, inking gesture 630 comprises a circle around a portion of existing text 620 and an arrow stemming from the ink-drawn circle. It is then determined that since inking gesture 630 comprises a circle and an arrow, inking gesture 630 comprising an editing gesture. In this example scenario, the circle and an arrow indicate that the user would like to add a comment in association with existing text 620. Although the circle and an arrow indicate a comment command in this example, it should be noted that other editing gestures may be used to indicate the comment command, such as an underline or an inked highlighting action. Additionally, in other example scenarios it should be appreciated that the circle and an arrow editing gesture may be used to indicate another instruction, such as an insert citation instruction.

In a next operation, overlay canvas 612 is presented and responsively receives additional user input supplied by stylus 616. The additional user input comprises inking 640. As shown in FIG. 6, inking 640 may be written in large handwritten letters and cover a majority of the view in user interface 610. Furthermore, overlay canvas 612 is semi-transparent to allow the user to view document 660 rendered on canvas 611. This allows the user to have document 660 on canvas 611 in view without the distraction of writing over any of existing text 620 or inserted drawings.

Once the user has finished handwriting inking 640 using stylus 616, the inking 640 is converted into typewritten text 650 using a digital inking to text converter. At this point in the operation, overlay canvas 612 is removed from view in user interface 610. Typewritten text 650 is then attached to canvas 611 in a comment card. The comment card including typewritten text 650 is displayed on the side of canvas 611 in a format specified by formatting settings associated with comment cards of document 660.

Figure 7:
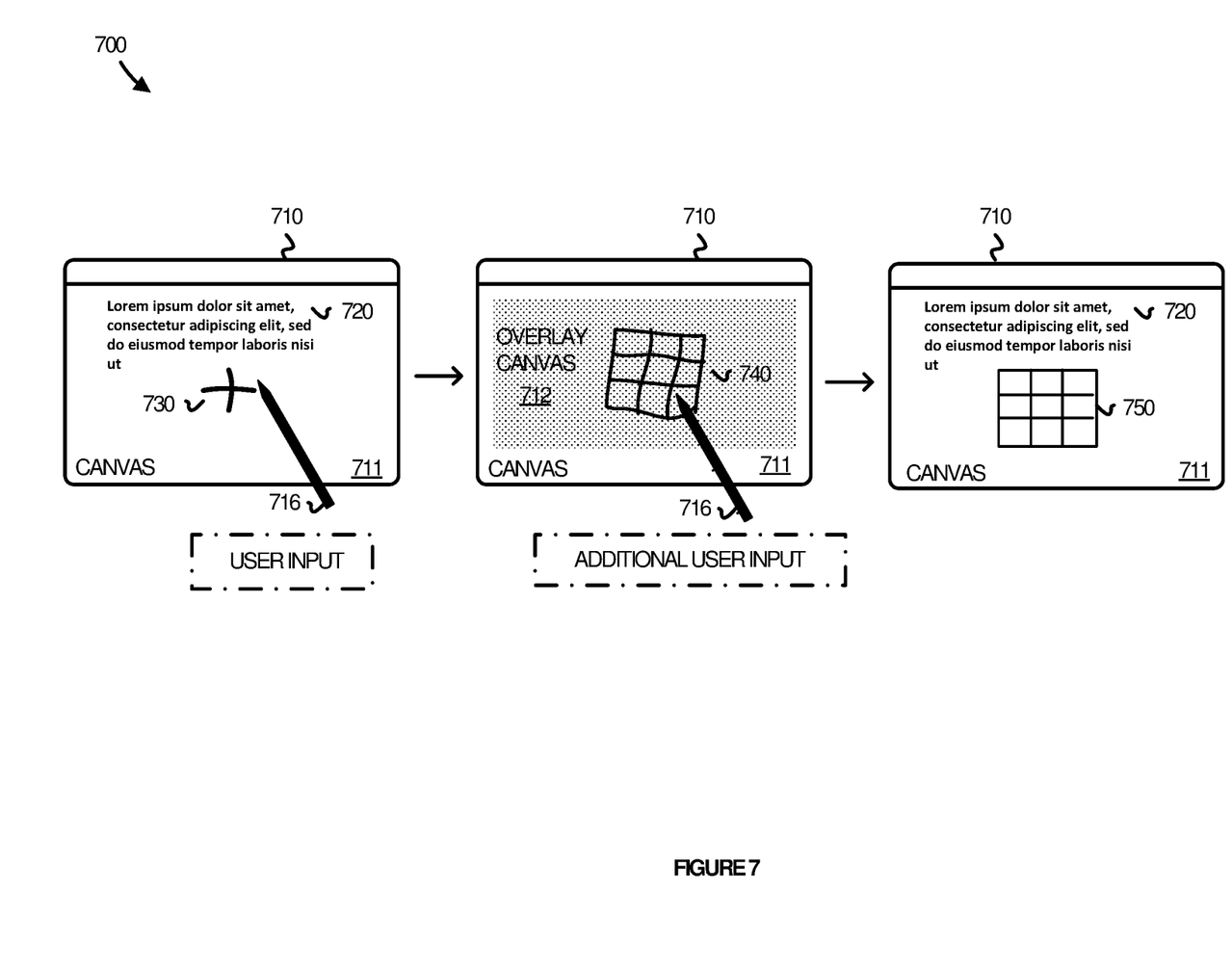
FIG. 7 illustrates an alternative operational scenario in an implementation of an enhanced canvas application.

FIG. 7 illustrates an alternative operational scenario for presenting an overlay canvas in response to receiving an editing gesture to existing text on a canvas that may be used in one or more scenarios of the present technology. FIG. 7 illustrates an operational scenario 700 that relates to what occurs when a user desires to insert a visual construct into the document. Operational scenario 700 includes user interface 710, canvas 711, and overlay canvas 712.

In a first operation, existing text 720 is displayed on canvas 711 in user interface 710. Inking gesture 730 is then supplied by stylus 716 on canvas 711 in user interface 710. In this example scenario, inking gesture 730 comprises a plus sign. It is then determined that since inking gesture 730 comprises a plus sign, inking gesture 730 comprising an editing gesture. In this example scenario, the plus sign indicates that the user would like to add a visual construct in association with existing text 720. Although the plus sign indicates a command to add a visual construct in this example scenario, it should be noted that other editing gestures may be used to indicate the visual construct command Additionally, in other example scenarios it should be appreciated that the plus sign editing gesture may be used to indicate another instruction.

In a next operation, overlay canvas 712 is presented and responsively receives additional user input supplied by stylus 716. The additional user input comprises hand-drawn table 740. As shown in FIG. 7, overlay canvas 712 is semi-transparent to allow the user to view existing text 720 rendered on canvas. Once the user has finished inking hand-drawn table 740 using stylus 716, hand-drawn table 740 is converted into visual construct 750 using a digital inking to graphic converter. At this point in the operation, overlay canvas 712 is removed from view in user interface 710. Visual construct 750 is then displayed on canvas 711 in association with existing text 720.

Figure 8:
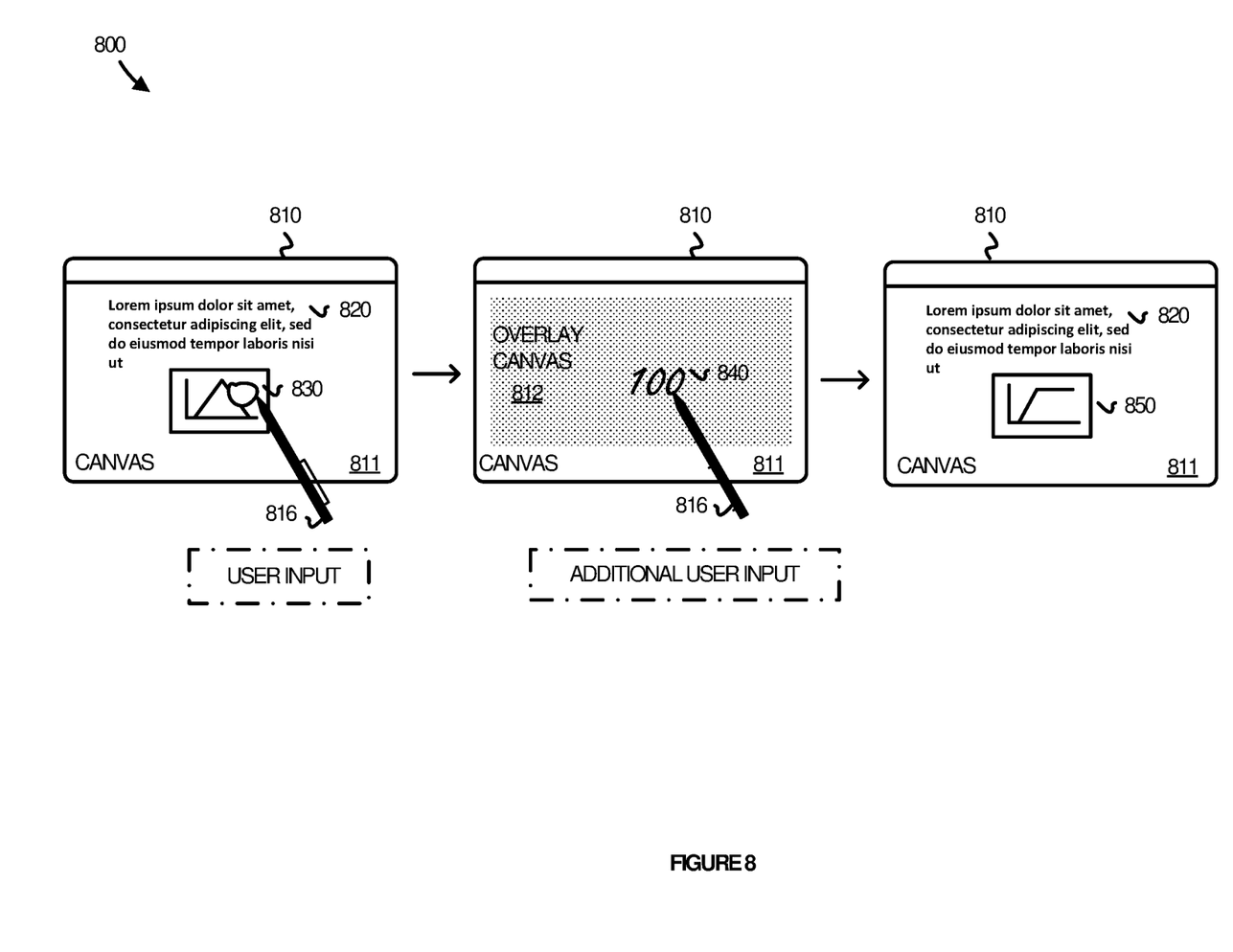
FIG. 8 illustrates an alternative operational scenario in an implementation of an enhanced canvas application.

FIG. 8 illustrates an alternative operational scenario for presenting an overlay canvas in response to receiving an editing gesture to existing text on a canvas that may be used in one or more scenarios of the present technology. FIG. 8 illustrates an operational scenario 800 that relates to what occurs when a user desires to use digital inking to edit a graph included in a document displayed on a canvas. Operational scenario 800 includes user interface 810, canvas 811, and overlay canvas 812.

In a first operation, existing text 820 is displayed on canvas 811 in user interface 810. Inking gesture 830 is then supplied by stylus 816 on canvas 811 in user interface 810. In this example scenario, inking gesture 830 comprises a circle on a visual construct included with existing text 820. It is then determined that since inking gesture 830 comprises a circle on a visual construct included with existing text 820, inking gesture 830 comprising an editing gesture. In this example scenario, the circle on a visual construct included with existing text 820 indicates that the user would like to modify a portion of the visual construct included with existing text 820.

In a next operation, overlay canvas 812 is presented and responsively receives additional user input supplied by stylus 816. The additional user input comprises inked data value 840. As shown in FIG. 8, inked data value 840 may be written in large handwritten numbers and cover a majority of the view in user interface 810. Once the user has finished inking data value 840 using stylus 816, data value 840 is converted into a data point included on visual construct 850 using a digital inking to graphic converter. At this point in the operation, overlay canvas 812 is removed from view in user interface 810. Visual construct 850 comprising the modified data point is then incorporated into the visual construct associated with existing text 820 which is displayed on canvas 811.

FIG. 9 illustrates computing system 901, which is representative of any system or visual representation of systems in which the various applications, services, scenarios, and processes disclosed herein may be implemented. Examples of computing system 901 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 901 may be implemented as a single apparatus, system, or device or may be implemented in a distributed manner as multiple apparatuses, systems, or devices. Computing system 901 includes, but is not limited to, processing system 902, storage system 903, software 905, communication interface system 907, and user interface system 909. Processing system 902 is operatively coupled with storage system 903, communication interface system 907, and user interface system 909.

Processing system 902 loads and executes software 905 from storage system 903. Software 905 includes process 906, which is representative of the processes discussed with respect to the preceding FIGS. 1-8, including inking process 200. When executed by processing system 902 to enhance a canvas application, software 905 directs processing system 902 to operate as described herein for at least the various processes, operational scenarios, and sequences discussed in the foregoing implementations. Computing system 901 may optionally include additional devices, features, or functionality not discussed for purposes of brevity.

Referring still to FIG. 9, processing system 902 may comprise a micro-processor and other circuitry that retrieves and executes software 905 from storage system 903. Processing system 902 may be implemented within a single processing device, but may also be distributed across multiple processing devices or sub-systems that cooperate in executing program instructions. Examples of processing system 902 include general purpose central processing units, graphical processing unites, application specific processors, and logic devices, as well as any other type of processing device, combination, or variation.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. Storage system 903 may be implemented as a single storage device, but may also be implemented across multiple storage devices or sub-systems co-located or distributed relative to each other. Storage system 903 may comprise additional elements, such as a controller, capable of communicating with processing system 902 or possibly other systems.

Software 905 may be implemented in program instructions and among other functions may, when executed by processing system 902, direct processing system 902 to operate as described with respect to the various operational scenarios, sequences, and processes illustrated herein. Software 905 may include program instructions for implementing inking process 200.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtual machine software, or other application software, in addition to or that include process 906. Software 905 may also comprise firmware or some other form of machine-readable processing instructions executable by processing system 902.

In general, software 905 may, when loaded into processing system 902 and executed, transform a suitable apparatus, system, or device (of which computing system 901 is representative) overall from a general-purpose computing system into a special-purpose computing system to enhance canvas service for presenting an overlay canvas in a user interface. Indeed, encoding software 905 on storage system 903 may transform the physical structure of storage system 903. The specific transformation of the physical structure may depend on various factors in different implementations of this description. Such factors may include, but are not limited to, the technology used to implement the storage media of storage system 903 and whether the computer-storage media are characterized as primary or secondary storage, as well as other factors.

If the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 909 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 909. In some cases, the input and output devices may be combined in a single device, such as a display capable of displaying images and receiving touch gestures. The aforementioned user input and output devices are well known in the art and need not be discussed at length here. User interface system 909 may also include associated user interface software executable by processing system 902 in support of the various user input and output devices discussed above.

Communication between computing system 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here.

In any of the aforementioned examples in which data, content, or any other type of information is exchanged, the exchange of information may occur in accordance with any of a variety of protocols, including FTP (file transfer protocol), HTTP (hypertext transfer protocol), HTTPS, REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Certain inventive aspects may be appreciated from the foregoing disclosure, of which the following are various examples.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. Those skilled in the art will understand and appreciate that a method could alternatively be represented as a series of interrelated states or events, such as in a state diagram. Moreover, not all acts illustrated in a methodology may be required for a novel implementation.

Example 1. A computer apparatus comprising: one or more computer readable storage media; one or more processors operatively coupled to the one or more computer readable storage media; and program instructions stored on the one or more computer readable storage media that, when executed by the one or more processors, direct the one or more processors to at least: receive user input comprising an inking gesture associated with existing text displayed on a canvas in a user interface; determine if the inking gesture comprises any of a plurality of editing gestures; in response to the inking gesture comprising an editing gesture, present an overlay canvas above the canvas in the user interface; receive additional user input comprising inking on the overlay canvas; and incorporate the inking into the existing text on the canvas.

Example 2. The computer apparatus of Example 1 wherein the program instructions further direct the one or more processors to identify an instruction corresponding to the editing gesture from a set of instructions each associated with an editing gesture.

Example 3. The computer apparatus of Examples 1-2 wherein the set of instructions comprises at least one of an instruction to insert the inking at a location where the editing gesture was written, replace a portion of the existing text with the inking, attach a comment card containing the inking to the existing text, insert a footnote or a citation including the inking to the existing text, or insert the inking into a visual construct rendered on the canvas in association with the existing text.

Example 4. The computer apparatus of Examples 1-3 wherein the inking comprises handwritten text and wherein to incorporate the inking into the existing text on the canvas the program instructions direct the one or more processors to: convert the handwritten text to typewritten text; and incorporate the typewritten text into the existing text on the canvas.

Example 5. The computer apparatus of Examples 1-4 wherein the editing gesture comprises inking at least one of a symbol, a circle, an arrow, an underline, or a set of brackets in association with the existing text displayed on the canvas in the user interface.

Example 6. The computer apparatus of Examples 1-5 wherein the overlay canvas comprises a semi-transparent canvas layered on top of the canvas.

Example 7. The computer apparatus of Examples 1-6 wherein the program instructions further direct the one or more processors to: render a content item comprising the existing text on the canvas; and incorporate the inking into the content item comprising the existing text.

Example 8. The computer apparatus of Examples 1-7 wherein the program instructions further direct the one or more processors to incorporate the inking into the existing text according to formatting settings associated with the existing text.

Example 9. A method comprising: receiving user input comprising an inking gesture associated with existing text displayed on a canvas in a user interface; determining if the inking gesture comprises any of a plurality of editing gestures; in response to the inking gesture comprising an editing gesture, presenting an overlay canvas above the canvas in the user interface; receiving additional user input comprising inking on the overlay canvas; and incorporating the inking into the existing text on the canvas.

Example 10. The method of Example 9 further comprising identifying an instruction corresponding to the editing gesture from a set of instructions each associated with an editing gesture.

Example 11. The method of Examples 9-10 wherein the set of instructions comprises at least one of an instruction to insert the inking at a location where the editing gesture was written, replace a portion of the existing text with the inking, attach a comment card containing the inking to the existing text, insert a footnote or a citation including the inking to the existing text, or insert the inking into a visual construct rendered on the canvas in association with the existing text.

Example 12. The method of Examples 9-11 wherein the inking comprises handwritten text and wherein incorporating the inking into the existing text on the canvas comprises: converting the handwritten text to typewritten text; and incorporating the typewritten text into the existing text on the canvas.

Example 13. The method of Examples 9-12 wherein the editing gesture comprises inking at least one of a symbol, a circle, an arrow, an underline, or a set of brackets associated with the existing text displayed on the canvas in the user interface.

Example 14. The method of Examples 9-13 wherein the overlay canvas comprises a semi-transparent canvas layered on top of the canvas.

Example 15. The method of Examples 9-14 further comprising: rendering a content item comprising the existing text on the canvas; and incorporating the inking into the content item comprising the existing text.

Example 16. The method of Examples 9-15 further comprising incorporating the inking into the existing text according to formatting settings associated with the existing text.

Example 17. One or more computer readable storage media having program instructions stored thereon, wherein the program instructions, when executed by one or more processors, direct the one or more processors to at least: receive user input comprising an inking gesture associated with existing text displayed on a canvas in a user interface; determine if the inking gesture comprises any of a plurality of editing gestures; in response to the inking gesture comprising an editing gesture, present an overlay canvas above the canvas in the user interface; receive additional user input comprising inking on the overlay canvas; and incorporate the inking into the existing text on the canvas.

Example 18. The one or more computer readable storage media of Example 17 wherein the program instructions further direct the one or more processors to identify an instruction corresponding to the editing gesture from a set of instructions each associated with an editing gesture.

Example 19. The one or more computer readable storage media of Examples 17-18 wherein the set of instructions comprises at least one of an instruction to insert the inking at a location where the editing gesture was written, replace a portion of existing text with the inking, attach a comment card containing the inking, insert a footnote or a citation including the inking, or insert the inking into a visual construct rendered on the canvas.

Example 20. The one or more computer readable storage media of Examples 17-19 wherein the set of instructions comprises at least one of an instruction to insert the inking at a location where the editing gesture was written, replace a portion of the existing text with the inking, attach a comment card containing the inking to the existing text, insert a footnote or a citation including the inking to the existing text, or insert the inking into a visual construct rendered on the canvas in association with the existing text.

What is claimed is:

1. A computer apparatus comprising:
one or more computer readable storage media;
one or more processors operatively coupled to the one or more computer readable storage media; and
program instructions stored on the one or more computer readable storage media that, when executed by the one or more processors, direct the one or more processors to at least:
receive user input comprising an inking gesture associated with existing typed text displayed on a document canvas in a user interface;
determine if the inking gesture comprises any of a plurality of editing gestures;
in response to the inking gesture comprising an editing gesture, present an overlay canvas above the document canvas in the user interface;
receive additional user input comprising inking on the overlay canvas;
convert the inking to a typewritten rendering of the inking; and
incorporate the typewritten rendering of the inking into the existing typed text on the document canvas.

2. The computer apparatus of claim 1 wherein the program instructions further direct the one or more processors to identify an instruction corresponding to the editing gesture from a set of instructions each associated with a different editing gesture.

3. The computer apparatus of claim 2 wherein the set of instructions comprises at least one of an instruction to insert the inking at a location where the editing gesture was written, replace a portion of the existing typed text with the inking, attach a comment card containing the inking to the existing typed text, insert a footnote or a citation including the inking to the existing typed text, and insert the inking into a visual construct rendered on the document canvas in association with the existing typed text.

4. The computer apparatus of claim 1 wherein the inking comprises handwritten text and wherein to convert the inking to the typewritten rendering of the inking, the program instructions direct the one or more processors to:
convert the handwritten text to typewritten text; and
incorporate the typewritten text into the existing typed text on the document canvas.

5. The computer apparatus of claim 1 wherein the editing gesture comprises inking at least one of a symbol, a circle, an arrow, an underline, or a set of brackets associated with the existing typed text displayed on the document canvas in the user interface.

6. The computer apparatus of claim 1 wherein the overlay canvas comprises a semi-transparent canvas layered on top of the document canvas.

7. The computer apparatus of claim 1 wherein the program instructions further direct the one or more processors to:
render a content item comprising the existing typed text on the document canvas; and
incorporate the typewritten rendering of the inking into the content item comprising the existing typed text on the document canvas.

8. The computer apparatus of claim 1 wherein the program instructions further direct the one or more processors to convert the inking to the typewritten rendering of the inking and incorporate the typewritten rendering of the inking into the existing typed text on the document canvas according to formatting settings associated with the existing typed text.

9. A method comprising:
receiving user input comprising an inking gesture associated with existing typed text displayed on a document canvas in a user interface;
determining if the inking gesture comprises any of a plurality of editing gestures;
in response to the inking gesture comprising an editing gesture, presenting an overlay canvas above the document canvas in the user interface;
receiving additional user input comprising inking on the overlay canvas;
converting the inking to a typewritten rendering of the inking; and
incorporating the typewritten rendering of the inking into the existing typed text on the document canvas.

10. The method of claim 9 further comprising identifying an instruction corresponding to the editing gesture from a set of instructions each associated with a different editing gesture.

11. The method of claim 10 wherein the set of instructions comprises at least one of an instruction to insert the inking at a location where the editing gesture was written, replace a portion of the existing typed text with the inking, attach a comment card containing the inking to the existing typed text, insert a footnote or a citation including the inking to the existing typed text, and insert the inking into a visual construct rendered on the document canvas in association with the existing typed text.

12. The method of claim 9 wherein the inking comprises handwritten text and wherein converting the inking to the typewritten rendering of the inking comprises:
converting the handwritten text to typewritten text; and
incorporating the typewritten text into the existing typed text on the document canvas.

13. The method of claim 9 wherein the editing gesture comprises inking at least one of a symbol, a circle, an arrow, an underline, or a set of brackets associated with the existing typed text displayed on the document canvas in the user interface.

14. The method of claim 9 wherein the overlay canvas comprises a semi-transparent canvas layered on top of the document canvas.

15. The method of claim 9 further comprising:
rendering a content item comprising the existing typed text on the document canvas; and
incorporating the typewritten rendering of the inking into the content item comprising the existing typed text on the document canvas.

16. The method of claim 9 further comprising converting the inking to the typewritten rendering of the inking and incorporating the typewritten rendering of the inking into the existing typed text on the document canvas according to formatting settings associated with the existing typed text.

17. One or more computer readable storage media having program instructions stored thereon, wherein the program instructions, when executed by one or more processors, direct the one or more processors to at least:
receive user input comprising an inking gesture associated with existing typed text displayed on a document canvas in a user interface;
determine if the inking gesture comprises any of a plurality of editing gestures;
in response to the inking gesture comprising an editing gesture, present an overlay canvas above the document canvas in the user interface;
receive additional user input comprising inking on the overlay canvas;
convert the inking to a typewritten rendering of the inking; and
incorporate the typewritten rendering of the inking into the existing typed text on the document canvas.

18. The one or more computer readable storage media of claim 17 wherein the program instructions further direct the one or more processors to identify an instruction corresponding to the editing gesture from a set of instructions each associated with a different editing gesture.

19. The one or more computer readable storage media of claim 18 wherein the set of instructions comprises at least one of an instruction to insert the inking at a location where the editing gesture was written, replace a portion of the existing typed text with the inking, attach a comment card containing the inking to the existing typed text, insert a footnote or a citation including the inking to the existing typed text, and insert the inking into a visual construct rendered on the document canvas in association with the existing typed text.

20. The one or more computer readable storage media of claim 17 wherein the inking comprises handwritten text and wherein to convert the inking to the typewritten rendering of the inking, the program instructions direct the one or more processors to:
convert the handwritten text to typewritten text; and
incorporate the typewritten text into the existing typed text on the document canvas.

* * * * *